(12) United States Patent
Retamero De La Rosa et al.

(10) Patent No.: US 10,889,685 B2
(45) Date of Patent: Jan. 12, 2021

(54) METHODS FOR THE PREPARATION OF CYCLIC IMINO ETHER POLYMERS

(71) Applicants: UNIVERSITEIT GENT, Ghent (BE); UNIVERSITEIT HASSELT, Hasselt (BE)

(72) Inventors: Victor Retamero De La Rosa, Ghent (BE); Evelien Baeten, Niel-Bij-As (BE); Richard Hoogenboom, Terneuzen (NL); Tanja Junkers, Diepenbeek (BE)

(73) Assignees: Universiteit Gent, Ghent (BE); Universiteit Hasselt, Hasselt (BE)

( * ) Notice: Subject to any disclaimer, the term of this patent is extended or adjusted under 35 U.S.C. 154(b) by 257 days.

(21) Appl. No.: 16/095,606

(22) PCT Filed: Apr. 21, 2017

(86) PCT No.: PCT/EP2017/059472
§ 371 (c)(1),
(2) Date: Oct. 22, 2018

(87) PCT Pub. No.: WO2017/182610
PCT Pub. Date: Oct. 26, 2017

(65) Prior Publication Data
US 2020/0148823 A1    May 14, 2020

(30) Foreign Application Priority Data
Apr. 22, 2016    (EP) .................................. 16166710

(51) Int. Cl.
*C08G 73/02*    (2006.01)

(52) U.S. Cl.
CPC ................ *C08G 73/0233* (2013.01)

(58) Field of Classification Search
CPC ........................ C08G 73/0233; C08G 69/00
See application file for complete search history.

(56) References Cited

U.S. PATENT DOCUMENTS 10,118,991 B2 *  11/2018   Hoogenboom .... C08G 73/0233

FOREIGN PATENT DOCUMENTS

GB    1238004    1/1969

OTHER PUBLICATIONS

Hoogenboom, Richard. "Upscaling Microwave-Assisted Polymerizations." Advances in Polymer Science. 274 (2016): 295-308.
PCT International Search Report and Written Opinion, Application No. PCT/EP2017/059472, dated Aug. 28, 2017.

(Continued)

*Primary Examiner* — Shane Fang
(74) *Attorney, Agent, or Firm* — Patent Law Works, LLP

(57) ABSTRACT

Cyclic imino ether polymers, such as polyoxazolines or polyoxazines, having a low polydispersity index can be obtained in a tubular flow reactor by applying a sufficiently high linear flow velocity of the reaction mixture in the tubular flow reactor, such as a flow velocity of least 100 cm/min or at least 120 cm/min. Also, methods to control the polydispersity of a cyclic imino ether polymer during polymerization are provided.

19 Claims, 2 Drawing Sheets

(56) References Cited

OTHER PUBLICATIONS

Figure 1:
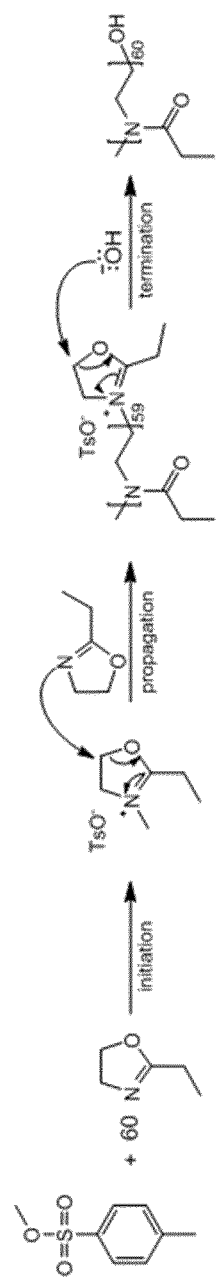

Paulus, et al. "Scale-up of Microwave-Assisted Polymerizations in Continuous-Flow Mode: Cationic Ring-Opening Polymerization of 2-Ethyl-2-Oxazoline." Macromolecular Rapid Communications. 28.4 (2007): 484-491.
Baeten et al., Polyoxazolines from Cationic Polymerization in Continuous Microflow Reactors, Feb. 27, 2014, Universiteit Hasselt, Polymer Reaction Design, (Poster 1), 1 page.
Baeten, et al., Continuous Block Copolymer Synthesis via Living Catonic Polymerization in Microflow Reactors, May 19, 2014, Polymer Reaction Design, Universiteit Hasselt, (Poster 2), 1 page.
Baeten, et al., Poly(2-oxazoline) Block CoPolymer Synthesis in Continous Microflow Reactors, Sep. 19, 2014, Universiteit Hasselt, Polymer Reaction Design, (Poster 3), 1 page.
Baeten, et al., Triblock Copolymer Synthesis in Microflow, Mar. 19, 2015, Universiteit Hasselt, Polymer Reaction Design, (Poster 4), 1 page.
Baeten, et al., Poly(2-Oxazoline) Triblock Copolymer Synthesis in a Microfluidic Reactor Cascade, (2015), Universiteit Hasselt, Polymer Reaction Design, (Poster 5), 1 page.
Baeten, et al., Polymerization of Cyclic Phosphates in a Continuous Microflow Reactor, (2015), Universiteit Hasselt, Polymer Reaction Design, (Poster 6), 1 page.
Baeten, et al., Towards Multiblock Copolymer Synthesis via RAFT in a Microfluidic Reactor Cascade, Jan. 18, 2016, Universiteit Hasselt, Polymer Reaction Design, (Poster 7), 1 page.
Baeten, et al.,Continuous Flow Synthesis Towards Complex Macromolecular Materials: One-Step Synthesis of Poly (2-Oxazoline) Triblock Copolymers, Feb. 15, 2016, Universiteit Hasselt, Polymer Reaction Design, (Poster 8), 1 page.
Communication Pursuant to Article 94(3) EPC, Application No. 17721972.2, Applicant Universiteit Gent, et al., European Patent Office, dated Aug. 29, 2019, 6 pages.
Communication Pursuant to Rule 114(2) EPC, Application No. 17721972.2, European Patent Office, dated Sep. 13, 2019. Transmittal of the Third Party Observations filed on Aug. 21, 2018, 18 pages.

* cited by examiner

METHODS FOR THE PREPARATION OF CYCLIC IMINO ETHER POLYMERS

FIELD OF THE INVENTION

The present invention concerns methods for the preparation of cyclic imino ether polymers having a low polydispersity index, and their use. More in particular, the present invention relates to methods for the preparation of polyoxazolines in a tubular flow reactor having a low polydispersity index. The present invention further concerns methods to control the polydispersity of said cyclic imino ether polymers.

BACKGROUND TO THE INVENTION

Cyclic imino ethers, such as oxazolines or oxazines, can be transformed through a ring-opening polymerization reaction in a range of polymers, which possess useful physical and mechanical properties. In the particular case of poly(2-oxazoline)s, the living cationic ring-opening polymerization of 2-oxazolines enables the synthesis of a wide range of polymer architectures with a variety of end-groups. The versatility of this living polymerization method allows the preparation of well-defined polyamides with tuneable properties of high interest in a wide range of applications spanning the engineering as well as the biomedical field.

Polyoxazolines are typically prepared in a batch-type process. In the past, this polymerization reaction was a slow process with polymerization times ranging from hours to days. The introduction of microwave synthesizers for the polymerization of 2-oxazolines allowed the application of high reaction temperatures, thereby reducing polymerization times to minute scale (Wiesbrock et al., Macromolecules 2005, 38, 5025-5034). However, due to the low penetration depth of microwaves, the use of microwave synthesizers is limited to 1 litre reactors. A different heating source is thus required if larger production outputs are needed. In addition, the polymerization of 2-oxazolines at high temperatures is a highly exothermic process, complicating temperature and pressure control and presenting a safety risk. The polymerization of 2-oxazolines at high temperatures via a batch process in a closed, pressurized reactor thus constitutes a major safety challenge for up-scaling polyoxazoline production, although, advantageously, the polydispersity of the polyoxazolines obtained via a batch process is very low (with Polydispersity Index or PDI of about 1.1).

A few publications deal with the preparation of polyoxazolines in a continuous process. Paulus et al. (Macromol. Rapid Commun. 2007, 28, 484) disclose the microwave-assisted polyoxazoline polymerization under continuous-flow reaction conditions. Different reactor types were used, in particular glass and Teflon coils and a continuous stirred tank reactor. It was found that all the continuous-flow microwave polymerizations resulted in broader molecular weight distributions compared to a microwave-assisted polymerization in batch mode. In addition, the broadening of the molecular-weight distributions seemed to increase with the flow rate.

WO2014191171 discloses a continuous process for the preparation of polyoxazolines in a tubular flow reactor segment, particularly a tubular flow reactor segment comprising a static mixer. This process mentions significant advantages compared to the batch process. However, under the particular reaction conditions disclosed in WO2014191171 (i.e. a tubular flow reactor with static mixers, polymerization at 90° C.), polyoxazolines with molecular weight of 4 850 g/mol (corresponding to only about 30 repeating units) and a PDI of 1.6 were obtained. In addition, under these reaction conditions, the polymerization is very slow and, therefore, the output is rather low. Moreover, the obtained polymers are substantially more polydisperse than in the batch process.

Accordingly, there is a need in the art for improved methods for the preparation of cyclic imino ether polymers, such as polyoxazolines, with a narrow molecular weight distribution of the obtained polymers and in sufficient and relevant quantities for their application.

SUMMARY OF THE INVENTION

The inventors have developed a continuous process for the preparation of cyclic imino ether polymers, such as polyoxazolines or polyoxazines, having a polydispersity index comparable to that of polymers prepared in a batch type process, using a tubular flow reactor. The inventors have surprisingly found that performing the polymerization at higher flow velocities resulted in a more controlled polymerization, i.e. cyclic imino ether polymers with a narrow molecular weight distribution were obtained. This is unexpected, as the polymer is subjected to higher shear forces in higher flow velocities, theoretically leading to a more pronounced parabolic velocity profile in the conduits of the flow reactor which negatively affects residence time distribution, as e.g. observed by Paulus et al. (Macromol. Rapid Commun. 2007, 28, 484).

A first aspect of the present invention provides a method for the preparation of cyclic imino ether polymers in a tubular flow reactor wherein a reaction mixture comprising a cyclic imino ether monomer is fed to the tubular flow reactor, and allowing the polymerization reaction to proceed, characterized in that the linear flow velocity of said reaction mixture in said tubular flow reactor is at least 100 cm/min, preferably at least 150 cm/min or 200 cm/min. In particular embodiments, the polymerization reaction occurs under a laminar flow regime.

Said cyclic imino ether polymers can be homopolymers or copolymers.

In particular embodiments, said cyclic imino ether polymer is a polyoxazoline polymer and said cyclic imino ether monomer is an oxazoline monomer. More in particular, said oxazoline monomer is a 2-oxazoline monomer according to formula (III)

wherein R1 is H, CN, NO$_2$, alkyl, alkenyl, alkynyl, aryl, heteroaryl or heterocyclyl.

In other particular embodiments, said cyclic imino ether polymer is a polyoxazine polymer and said cyclic imino ether monomer is an oxazine monomer. More in particular, said oxazine monomer is a 2-oxazine monomer according to formula (IV)

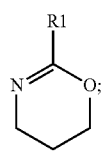

(IV)

wherein R1 is H, CN, NO$_2$, alkyl, alkenyl, alkynyl, aryl, heteroaryl or heterocyclyl.

In particular embodiments, said cyclic imino ether polymers, preferably polyoxazoline or polyoxazine polymers, obtained by the methods envisaged herein, have a polydispersity index of 1.40 or less, preferably a polydispersity index of 1.20 or less, for example a polydispersity index of 1.15 or less.

In particular embodiments, said cyclic imino ether polymers, preferably polyoxazoline or polyoxazine polymers, obtained by the methods envisaged herein, have a degree of polymerization of at least 5, preferably at least 10 or higher.

In particular embodiments, the polymerization reaction is performed at a temperature ranging from 120° C. to 200° C., preferably from 140° C. to 180° C. In particular embodiments, the tubular flow reactor is heated by conductive heating.

In particular embodiments of the continuous process as envisaged herein, the polymerization reaction is performed at a pressure of at least 5 bar or at least 10 bar, preferably ranging from 10 to 30 bar.

In particular embodiments, the tubular flow reactor as used in the methods envisaged herein has a surface to volume ratio of at least 250 m$^2$/m$^3$, preferably at least 1000 m$^2$/m$^3$. More in particular, said tubular flow reactor comprises a hollow conduit having an inner diameter ranging from 0.25 to 10.00 mm, preferably ranging from 0.50 to 5.00 mm.

A second aspect of the present invention provides a method for controlling the polydispersity of cyclic imino ether polymers, preferably polyoxazoline or polyoxazine polymers, comprising feeding a reaction mixture comprising a cyclic imino ether monomer, preferably an oxazoline or oxazine monomer, to a tubular flow reactor and allowing the polymerization reaction to proceed, wherein increasing the linear flow velocity of the reaction mixture in the tubular flow reactor decreases the polydispersity of said cyclic imino ether polymers, preferably polyoxazoline or polyoxazine polymers. In a preferred embodiment, the relation between the linear flow velocity v and the polydispersity Đ can be described by an exponential decay type function defined as follows:

$$Đ = (0.08 \pm 0.01)e^{\frac{-v}{(147 \pm 28)}} + Đ_0$$

wherein Đ is defined as molar mass dispersity ($\overline{M}w/\overline{M}n$), and v as the linear flow velocity expressed in cm min$^{-1}$. Đ$_0$ is the minimum dispersity attainable for a particular polymer, and it is dependent on the internal diameter of the tubular reactor. Larger diameters yield higher Đ$_0$ values.

FIGURE LEGENDS

FIG. 1 presents the scheme for the cationic ring-opening polymerization of 2-ethyl-2-oxazoline according to a specific embodiment of the present invention.

Figure 2A:
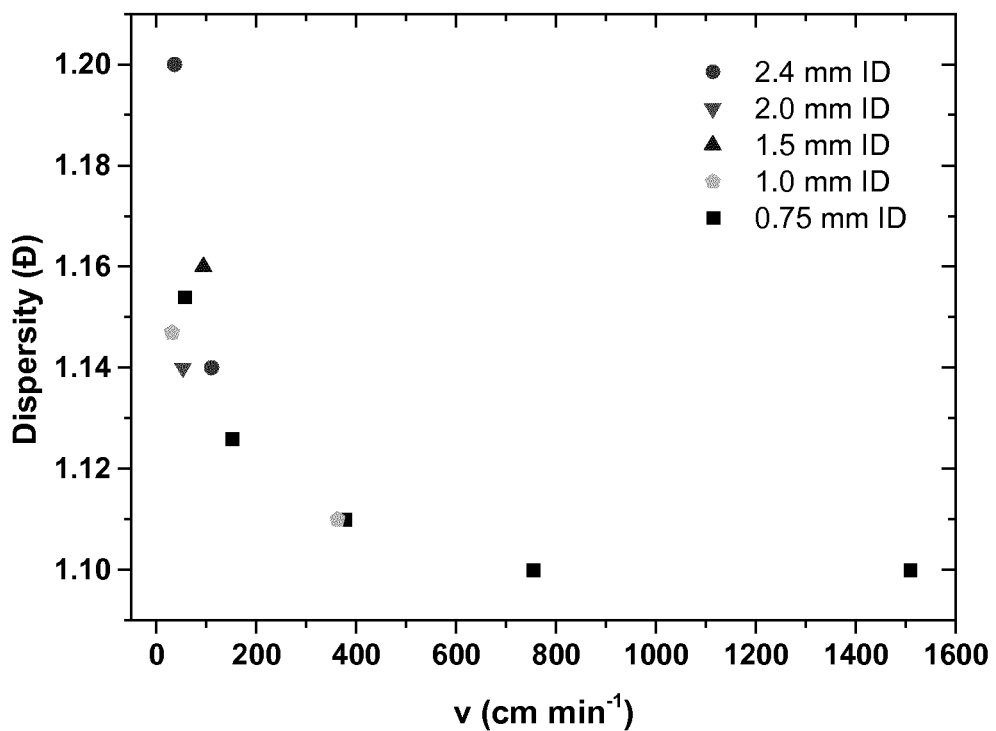
Figure 2B:
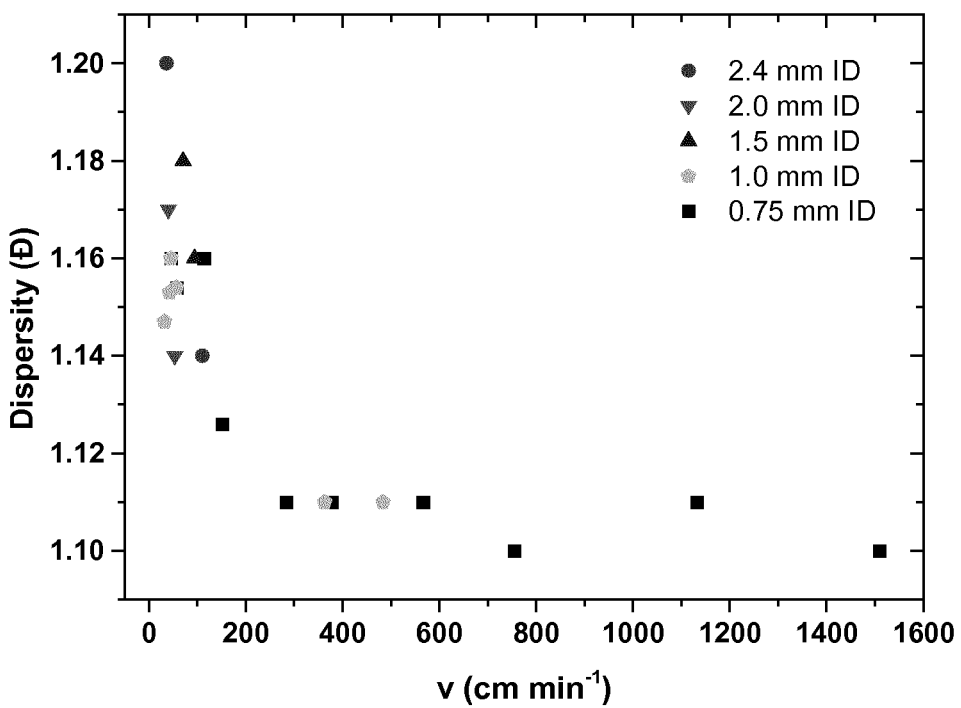

FIG. 2 represents the polydispersity index (dispersity) of polyoxazolines in function of the linear velocity of the reaction fluid in a flow reactor with different internal diameter, using the optimal reaction time of 3 or 4 minutes for each reactor (2A) or using both 3 and 4 minute reaction time data (2B), according to a specific embodiment of the present invention.

DETAILED DESCRIPTION OF INVENTION

Before the present methods and uses of the invention are described, it is to be understood that this invention is not limited to particular methods and uses or combinations described, since such methods and uses and combinations may, of course, vary. It is also to be understood that the terminology used herein is not intended to be limiting. Likewise, in the present description of the invention, reference is made to the accompanying drawings and examples that form a part hereof, and in which are shown by way of illustration only of specific embodiments in which the invention may be practiced. Parenthesized reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≤3, ≤4, ≤5, ≤6 or ≤7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the term "number average molecular weight (Mn)" relates to the statistical average molecular weight of all the polymer chains in the sample. It is determined by dividing the total weight (mass) of the polymers by the total number of polymers in the population, according to the formula:

$$M_n = \frac{\sum_i N_i M_i}{\sum_i N_i},$$

wherein $M_i$ is the molecular weight of an individual polymer chain and $N_i$ is the number of molecules with molecular weight $M_i$.

As used herein, the term "weight average molecular weight (Mw)" takes into account the molecular weight of a polymer chain in determining contributions to the molecular weight average, according to the formula:

$$M_w = \frac{\sum_i N_i M_i^2}{\sum_i N_i M_i}$$

The determination of the number average and weight average molecular weight (mass) of polymers by e.g. size exclusion chromatography (SEC) or other techniques is well known by the skilled person. For instance, size-exclusion chromatography (SEC) can be performed on HPLC system fitted with a suitable SEC column, wherein the molecular weights and the molecular weight distribution of the polymer population can be determined by comparison with the elution of suitable standards. A suitable setup includes an Agilent 1260-series HPLC system equipped with a 1260 online degasser, a 1260 ISO-pump, a 1260 automatic liquid sampler, a thermostated column compartment, a 1260 diode array detector (DAD) and a 1260 refractive index detector (RID), using two Mixed-D 30 cm columns (Agilent) and a Mixed-D precolumn (Agilent) in series at 50° C., with DMA containing 50 mM of LiCl as eluent, at a flow rate of 0.593 mL/min. Molecular weights can be calculated against PMMA standards.

The polydispersity index (PDI) is used herein interchangeably with the term molar mass dispersity (represented by the symbol Đ) and is a measure of the uniformity of the polymer population, or, stated differently, the distribution of molecular weights in a polymer population, and is calculated by the ratio of the weight average to the number average molecular weight of the polymer (Mw/Mn).

The term "alkyl", as a group or part of a group, as envisaged herein, refers to a hydrocarbyl group of Formula $C_pH_{2p+1}$ wherein p is a number ranging from 1 to 20 ("$C_1$-$C_{20}$ alkyl"). Generally, the alkyl groups comprise from 1 to 20 carbon atoms, for example 1 to 10 or 1 to 6 carbon atoms. Alkyl groups may be linear, or branched or cyclic including, for instance, methyl, ethyl, n-propyl, i-propyl, butyl and its isomers (e.g. n-butyl, i-butyl and t-butyl); pentyl and its isomers, hexyl and its isomers, heptyl and its isomers, octyl and its isomers, nonyl and its isomers, decyl and its isomers and the like. Furthermore, each of these alkyl groups can be optionally substituted with one or more substituents, such as a halogen, hydroxyl, amino, carboxyl, or alkoxy substituent. When a subscript is used herein following a carbon atom, the subscript refers to the number of carbon atoms that the named group may contain. Thus, for example, $C_{1-4}$ alkyl means an alkyl of 1, 2, 3 or 4 carbon atoms, and $C_{3-6}$ cycloalkyl refers to a cyclic alkyl group containing from 3 to 6 carbon atoms.

The term "alkenyl" by itself or as part of another substituent, as envisaged herein, refers to an alkyl group comprising at least one carbon-carbon double bond. Non-limiting examples of $C_{2-12}$alkenyl groups include ethenyl, 2-propenyl, 2-butenyl, 3-butenyl, 2-pentenyl and its chain isomers, 2-hexenyl and its chain isomers, 2,4-pentadienyl and the like.

The term "alkenyl" by itself or as part of another substituent, as envisaged herein, refers to an alkyl group comprising at least one carbon-carbon triple bond. Non limiting examples of C2-12alkynyl groups include ethynyl, 2-propynyl, 2-butynyl, 3-butynyl, 2-pentynyl and its chain isomers, 2-hexynyl and its chain isomers and the like.

The term "aryl" by itself or as part of another substituent, as envisaged herein, refers to polyunsaturated, aromatic hydrocarbyl group having a single ring (i.e. phenyl) or multiple aromatic rings fused together (e.g. naphthalene), or linked covalently, typically containing 6 to 16 atoms; wherein at least one ring is aromatic. Aryl rings may be unsubstituted or substituted with from 1 to 4 substituents on the ring. Aryl may be substituted with halo, cyano, nitro, hydroxy, carboxy, amino, acylamino, alkyl, heteroalkyl, haloalkyl, phenyl, aryloxy, alkoxy, heteroalkyloxy, carbamyl, haloalkyl, methylenedioxy, heteroaryloxy, or any combination thereof. Examples of $C_{6-10}$ aryl include phenyl, naphthyl, indanyl, 1,2,3,4-tetrahydro-naphthyl, and pyrenyl.

The term "heteroaryl" as envisaged herein refers to an aryl group in which one or more of the ring atoms is an element other than carbon, for example nitrogen, oxygen, sulfur, or a combination thereof. Examples of 5- to 14-membered heteroaryl include triazolyl, indolyl, and the like.

The term "heterocyclyl", as envisaged herein, refers to a mono- or polycyclic, saturated or mono-unsaturated or poly-unsaturated hydrocarbon group, typically having from 2 up to 15 carbon atoms and including one or more heteroatoms in one or more heterocyclic rings.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or elements may be combined in any suitable manner, as would be apparent to a person skilled in the art from this disclosure, in one or more embodiments. Furthermore, while some embodiments described herein include some but not other elements included in other embodiments, combinations of elements of different embodiments are meant to be within the scope of the invention, and form different embodiments, as would be understood by those in the art. For example, in the appended claims, any of the claimed embodiments can be used in any combination.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The inventors have surprisingly developed a continuous process for the preparation of cyclic imino ether polymers, such as polyoxazolines, in a tubular flow reactor, wherein the polydispersity of the polymers can be easily controlled by controlling the flow velocity of the reaction mixture in the tubular flow reactor, particularly in a tubular flow reactor which does not comprise a mixing means.

A first aspect of the present invention provides a method for the continuous preparation (polymerization) of cyclic imino ether polymers in a tubular flow reactor wherein a reaction mixture comprising a cyclic imino ether monomer is fed to the tubular flow reactor, particularly under conditions suitable for or by applying conditions for allowing the polymerization reaction to proceed, characterized in that the linear flow velocity of said reaction mixture in said tubular flow reactor is at least 100 cm/min, such as at least 120 cm/min or at least 140 cm/min, preferably at least 150 cm/min, at least 175 cm/min, or 200 cm/min, such as at least 250 cm/min or 300 cm/min.

In particular embodiments, the tubular flow reactor is operating in a laminar flow regime.

As envisaged herein, the cyclic imino ether polymers are obtainable by a ring-opening polymerization of a cyclic imino ether monomer. The term "cyclic imino ether polymer" as used herein refers to a polymer derived from a cyclic imino ether preferably via ring opening polymerization.

More particularly, such polymers are typically prepared from at least 50 wt % of a cyclic imino ether monomer of formula (I):

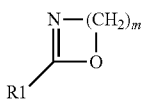
(I)

wherein m is an integer ranging from 2 to 5; such as m=2, 3 or 4; and wherein R1 preferably is selected from H, CN, NO$_2$, alkyl, alkenyl, alkynyl, aryl, heteroaryl or heterocyclyl. For instance, in certain embodiments, R1 is $C_{1-6}$alkyl, $C_{1-6}$alkenyl, $C_{1-6}$alkynyl, $C_{6-16}$aryl, or $C_{3-6}$cycloalkyl, such as R1 is $C_{1-4}$alkyl, $C_{1-4}$alkenyl, $C_{1-4}$alkynyl, $C_{6-16}$aryl, or $C_{3-6}$cycloalkyl.

In preferred embodiments, m is 2 or 3. In particularly preferred embodiments, m is 2. If m is 2, the monomer of formula (I) represents an oxazoline and the resulting polymer is a polyoxazoline. If m is 3, the monomer of formula (I) represents an oxazine and the resulting polymer is a polyoxazine.

Advantageously, the cyclic imino ether polymers as envisaged herein, obtainable/obtained by the methods of the present application, have a polydispersity index of about 1.40 or less, or preferably 1.30 or less, more preferably a polydispersity index of about 1.25 or 1.20 or less, even more preferably a polydispersity index of about 1.19, 1.18, 1.17, 1.16, 1.15, 1.14, 1.13, 1.12, 1.11, 1.10 or less.

In particular embodiments, the degree of polymerization of the cyclic imino ether polymer is at least 5, preferably at least 10 or is in the range from 10 to 1000, such as from 20 to 500, or from 50 to 200, for example about 50 or 100.

The term "cyclic imino ether polymer" as used herein also includes polymers prepared from at least 50 wt % of a cyclic imino ether of formula (I) wherein m and R1 are the same as described above, and wherein one or more hydrogen atoms in the (CH2)$_m$ moiety can each independently be replaced by a substituent selected from an alkyl, alkenyl, alkynyl, aryl and cycloalkyl, preferably replaced by a substituent selected from $C_{1-4}$alkyl, $C_{1-4}$alkenyl, $C_{1-4}$alkynyl, $C_{6-16}$aryl, and $C_{3-6}$cycloalkyl.

Cyclic imino ether polymers as envisaged herein may be prepared from mixtures of monomers of formula (I) having a different substituent R1, or all monomers may be provided with the same substituent R1.

In particular embodiments, the cyclic imino ether polymer is a homopolymer made up of monomers having the same substituent R1. In specific embodiments, the cyclic imino ether polymer is a homopolymer of formula (II):

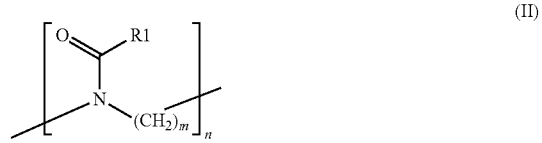
(II)

wherein n is the degree of polymerization; and wherein m and R1 have the same meaning as described above. In particular embodiments, the degree of polymerization (n) is at least 5, preferably at least 10 or is in the range from 10 to 1000, such as from 20 to 500, for example about 50 or 100.

The cyclic imino ether polymer as envisaged herein may comprise up to 50 wt % of comonomers. In embodiments wherein cyclic imino ether polymer is a copolymer, the copolymer preferably is a block copolymer or gradient copolymer. In particular embodiments, the cyclic imino ether polymer is produced from at least 75, 80, or 90 wt % of monomers of formula (I). The cyclic imino ether polymers as envisaged herein can be in the form of block polymers with controlled block lengths, random copolymers, polymers with functional end-groups, etc.

In particular embodiments, the cyclic imino ether monomer as envisaged herein is an oxazoline or an oxazine.

In preferred embodiments, the cyclic imino ether monomer is a substituted or unsubstituted oxazoline, more preferably an unsubstituted or 2-substituted 2-oxazoline. In particular embodiments, said oxazoline monomer is a is a 2-oxazoline monomer according to formula (III)

(III)

wherein R1 is H, CN, NO$_2$, alkyl, alkenyl, alkynyl, aryl, heteroaryl or heterocyclyl. For instance, in certain embodiments, R1 is $C_{1-6}$alkyl, $C_{1-6}$alkenyl, $C_{1-6}$alkynyl, $C_{6-16}$aryl, or $C_{3-6}$cycloalkyl, such as R1 is $C_{1-4}$alkyl, $C_{1-4}$alkenyl, $C_{1-4}$alkynyl, $C_{6-16}$aryl, or $C_{3-6}$cycloalkyl.

Particularly suitable cyclic imino ether monomers as envisaged herein include 2-methyl-2-oxazoline, 2-ethyl-2-oxazoline, 2-n-propyl-2-oxazoline, 2-i-propyl-2-oxazoline, 2-isopropenyl 2-oxazoline, 2-butyl-2-oxazoline, 2-(3-butenyl)-2-oxazoline, 2-(methoxycarboxyalkyl)-2-oxazoline such as 2-(methoxycarboxyethyl)-2-oxazoline, 2-phenyl 2-oxazoline, and combinations thereof. FIG. 1 shows an exemplary ring-opening polymerization of 2-ethyl-2-oxazoline.

In particular embodiments, the cyclic imino ether monomer is a substituted or unsubstituted oxazine monomer, more preferably a 2-oxazine monomer according to formula (IV)

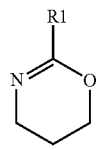
(IV)

wherein R1 is H, CN, $NO_2$, alkyl, alkenyl, alkynyl, aryl, heteroaryl or heterocyclyl. For instance, in certain embodiments, R1 is $C_{1-6}$alkyl, $C_{1-6}$alkenyl, $C_{1-6}$alkynyl, $C_{6-16}$aryl, or $C_{3-6}$cycloalkyl, such as R1 is $C_{1-4}$alkyl, $C_{1-4}$alkenyl, $C_{1-4}$alkynyl, $C_{6-16}$aryl, or $C_{3-6}$cycloalkyl.

The polyoxazoline or polyoxazine polymer as envisaged herein may be a homopolymer or may comprise up to 50 wt % of comonomers. In embodiments wherein said polyoxazoline or polyoxazine polymer is a copolymer, the copolymer can be in the form of block polymers, such as block polymers with controlled block lengths, gradient copolymers, random copolymers, polymers with functional end-groups, etc.

In addition to the cyclic imino ether monomer, particularly oxazoline or oxazine monomer, as envisaged herein, the reaction mixture further comprises one or more of the following components such as an initiator, a solvent, a terminating agent or a functionalizing agent.

The initiator is a strong electrophile, preferably is a weak Lewis acid, strong protic acid, an alkylhalide, a strong acid ester or a mixture thereof. Salts of such electrophiles with said cyclic imino ether monomer, particularly such salts of oxazoline, can also be used as initiator. Examples of suitable initiators include mono- or bifunctional alkyl, alkenyl, alkynyl or aryl halides, p-toluenesulfonates (or tosylates), such as methyl p-toluenesulfonate ($CH_3$—$OSO_2$—$C_6H_4$—$CH_3$) or allyl p-toluenesulfonate ($CH_2CHCH_2$—$OSO_2$—$C_6H_4$—$CH_3$), benzene sulfonates such as propargyl benzene sulfonate ($CHCCH_2$—$C_6H_5$), triflates, such as methyl triflate ($CH_3$—$OSO_2$—$CF_3$) or triflic acid (H—$OSO_2$—$CF_3$). Other examples include the salts of such electrophiles with oxazoline such as N—H— or N-Methyl-2-alkyl/aryl-oxazolinium benzylsulfonate, tosylate or triflate.

With the cyclic imine ether polymerization process being a living polymerization, the polymerization of the monomer progresses until the monomer is virtually exhausted and upon addition of further monomer or a different monomer, the polymerization resumes. Accordingly, the degree of polymerization and hence the molecular weight can be controlled by the monomer and initiator concentrations.

Preferred molar ratio of monomer to initiator is at least 5:1 or 10:1, preferably is at least 20:1 or 50:1. In certain embodiments, the monomer to initiator ratio ranges from 5:1 to 400:1, such as ranging from 10:1 and 300:1, or ranging from 50:1 to 200:1. In certain embodiments, the monomer concentration ranges from 1M to 6M, such as e.g. ranging from 2M to 5M, or from 2M to 4M.

In particular embodiments, the monomer conversion (or the amount of monomer that reacted in the tubular flow reactor) of the polymerization process as envisaged herein is at least 80%, preferably at least 90% or at least 95%. Determination of the monomer conversion is within the ordinary skill of the skilled person and can be performed by e.g. $^1$H-NMR or gas chromatography.

Suitable solvents include nitriles, esters, ethers, ketones or aromatics.

In a preferred embodiment, the cyclic imine ether polymer is further reacted with a termination agent or a functionalizing agent. Terminating agents are capable of terminating the living chain of the polymer obtainable by the process of the present invention. Functionalizing agents are capable of introducing functional end-groups which are available for further chemical reactions at the chain ends. Advantageously, said terminating agent is a functionalising agent.

Suitable terminating agents include but are not limited to nucleophiles such as hydroxide, amines, thiocarbonates, carboxylates, hydrazine, azides . . . ; Suitable functionalizing agents include but are not limited to inorganic acids and bases, acid halides, (oligo)amines, hydroxylamines, esters, alcohols, thiols, hydrazine . . . .

Optionally, the reaction mixture may also comprise one or more additional compounds, such as a surfactant or emulsifier, a filler, a colorant, a rheology modifier, a crosslinking agent or mixtures thereof.

As indicated above, the continuous process for the preparation of cyclic imino ether polymers, particularly polyoxazolines, as envisaged herein, can be used to prepare either homopolymers if the reaction mixture that is fed to the tubular flow reactor comprises only one type of cyclic imino ether monomer according to formula I, particularly one type of oxazoline monomer according to formula III; or random copolymers if the reaction mixture that is fed to the tubular flow reactor comprises at least two different cyclic imino ether monomers according to formula I, particularly at least two different oxazoline monomers according to formula III, having a different R1 group. In certain embodiments, the polymerization reaction as envisaged herein takes place in a tubular flow reactor comprising at least two tubular flow reactor segments connected in series. In certain embodiments, the continuous process for the preparation of cyclic imino ether polymers, particularly polyoxazolines, as envisaged herein, can be used to prepare polymers with different blocks or with blocks and random copolymers, by using a tubular flow reactor comprising at least two tubular flow reactor segments connected in series, wherein a reaction mixture comprising at least one cyclic imine ether monomer according to formula I, particularly at least one oxazoline according to formula III, is fed to the first tubular flow reactor segment and allowing the polymerisation reaction to proceed, and wherein subsequently one or more different cyclic imine ether monomers, particularly one or more different oxazoline monomers is added to the reaction mixture and fed to the second/other tubular flow reactor segment. In certain embodiments, the continuous process for the preparation of cyclic imino ether polymers, particularly polyoxazolines, as envisaged herein, can be used to prepare brush and star-shaped copolymers.

The continuous process for the preparation of cyclic imino ether polymers, particularly polyoxazolines, as envisaged herein is performed in a tubular flow reactor.

The tubular flow reactor as envisaged herein (also known as a tubular reactor or tube reactor) is a vessel through which flow is continuous, usually at steady state. It is typically a continuous, flowing system of cylindrical geometry, wherein the composition and chemical reaction conditions and conversion differ in the axial direction of the reactor and thus depend on the position in the reactor. Typically, a tubular flow reactor as envisaged herein does not comprise any static or dynamic mixing or agitation means. In contrast, in a continuous-flow stirred-tank reactor (CSTR), reactants and products are continuously added and withdrawn, and (mechanical) agitation or mixing means are required to achieve uniform composition and temperature within the whole reactor vessel.

The tubular flow reactor as envisaged herein comprises one or more hollow conduits or tubular segments, particularly narrow tubular hollow conduits, such as narrow tubings, wherein the polymerisation reaction takes place and which may be present as coils. Particularly in the case of multiple hollow conduits, these are typically coupled in series. Advantageously, series coupled tubular flow reactors allow to carry out post-polymerization modification reactions to obtain side-chain functional copolymers in a fully continuous flow process. In particular embodiments, the tubular flow reactor, or its one or more tubular flow reactor segments as envisaged herein, has a surface to volume ratio of at least 250 $m^2/m^3$, preferably at least 400 $m^2/m^3$, preferably at least 600 $m^2/m^3$, such as at least 1000 $m^2/m^3$, 2000 $m^2/m^3$ or 5 000 $m^2/m^3$. In particular embodiments, the tubular flow reactor, or a reactor segment thereof as envisaged herein, has a surface to volume ratio ranging from 250 to 30 000 $m^2/m^3$, or from 500 to 20 000 $m^2/m^3$, such as from 1 000 to 16 000 $m^2/m^3$ or from 1 000 to 10 000 $m^2/m^3$, or more preferably, ranging from 3 000 to 6 000 $m^2/m^3$.

Advantageously, a narrow tubular flow reactor as envisaged herein offers a large surface to volume ratio, which cannot be achieved by batch or continuous stirred tank (CSTR) reactors. Combined with thermal heating of the reactor, excellent control of the reaction temperature within the tubular flow reactor can be achieved, particularly by minimizing the radial temperature gradient within the reactor tubing. Indeed, when working at elevated temperatures, a narrow tubing provides immediate and homogeneous heating of the mixture and prevents temperature gradients that would negatively affect control over the polymerization. In addition, the heat formed during the initial phase of the polymerization can efficiently diffuse out to the environment minimizing temperature overshoot and improving control. This allows the polymerization reaction to be performed at higher temperatures, thus reducing reaction times and allowing faster flow rates. In addition, since with continuous flow narrow tubing reactors, the reactor volume is relatively limited the hazards of working at high temperatures and pressures are minimized. In addition, a continuous reactor set-up as disclosed herein is a versatile system, as process parameters, such as temperature, flow rate, pressure, monomer and reagent concentrations can be easily tuned for the production of polymers differing in length and compositions using the same set-up, and allows obtaining application relevant quantities.

In particular embodiments, the tubular flow reactor, or its one or more tubular flow reactor segments as envisaged herein, comprises a hollow conduit having an inner diameter (ID) of at least 0.25 mm, preferably has an inner diameter in the range from 0.25 mm to 25 mm, such as from 0.25 mm to 10 mm, more preferably has an inner diameter in the range from 0.5 mm to 5.0 mm, more preferably has an inner diameter in the range from 0.5 or 1.0 mm to 3.0 mm. In particular embodiments, the tubular flow reactor, or the one or more tubular flow reactor segments as envisaged herein, comprises a hollow conduit having an inner volume of at least 1 mL, such as an inner volume ranging from 1 mL to 100 mL. In certain embodiments, the length to diameter ratio ranges from at least 100, up to 200 000, preferably ranging from 10 000 to 100 000, more preferably from 40 000 to 80 000.

The tubular flow reactor as envisaged herein can be made from a polymer, such as PFA, PEEK or PTFE material, or metal, such as stainless steel, or nickel, titanium, glass or Teflon coated stainless steel.

In particular embodiments, the system comprising the tubular flow reactor as envisaged herein further comprises means to heat or cool the tubular flow reactor to control the temperature at which the polymerization reaction is performed. In preferred embodiments the tubular flow reactor as envisaged herein is heated by conductive heating, such as by using a thermostated oven, thermostated jacketed tubing, heated oil (such as in an oil bath or heat exchanger) or a heated metal block (around which the tubular flow reactor is coiled) as heat source.

In particular embodiments, the system comprising the tubular flow reactor as envisaged herein further comprises one or more pumps, particularly pumps with pressure control) for pumping the reactants or the reaction mixture through the tubular flow reactor as envisaged herein, valves, such as shut-off valves or valves for switching from different reaction mixtures or reactants.

In particular embodiments, the reaction mixture comprising monomer and initiator is mixed before being applied as a single feed (by a single pump) to the tubular flow reactor as envisaged herein. In other embodiments, a monomer and initiator stream are pumped separately to the reactor (i.e. a dual feeding of the reactor) and mixed by a (static) mixer before entering the tubular flow reactor as envisaged herein. Accordingly, in particular embodiments, the system comprising the tubular flow reactor as envisaged herein further comprises one or more mixers to efficiently homogenize the two miscible streams before entering the reactor.

In particular embodiments, an additional terminating agent stream can be added to the set-up, to add the terminating agent to the reaction mixture and to obtain end-chain functionalized cyclic imino ether polymers, particularly polyoxazolines.

In a preferred embodiment of the continuous process as envisaged herein, the polymerisation reaction in said tubular flow reactor as envisaged herein is performed at a pressure of at least 5 bar, preferably at least 10 bar, more preferably ranging from 10 to 30 bar.

In a preferred embodiment of the continuous process as envisaged herein, the polymerisation reaction in said tubular flow reactor as envisaged herein is performed at a temperature of at least 120° C., such as ranging from 120° C. to 200° C., preferably ranging from 140° C. to 180° C. Due to the large surface area per reaction volume in the narrow tubular flow reactor as envisaged herein, heat transfer is faster and thus the process can be run at a wide temperature range.

If the tubular flow reactor as envisaged herein comprises multiple tubular hollow conduits coupled in series, each tubular flow reactor segment may have the same pressure or temperature conditions, or the temperature and/or pressure may vary between the different tubular flow reactor segments.

A second aspect of the present invention provides a method for controlling the polydispersity of cyclic imino ether polymers, preferably polyoxazoline or polyoxazine polymers, comprising feeding a reaction mixture comprising a cyclic imino ether monomer according to formula I, preferably an oxazoline or oxazine monomer according to formula III or IV, respectively, to a tubular flow reactor as envisaged herein and allowing the polymerization reaction to proceed, wherein increasing the linear flow velocity of the reaction mixture in the tubular flow reactor decreases the polydispersity of said cyclic imino ether polymers, preferably polyoxazoline or polyoxazine polymers. In a preferred embodiment, the relation between the linear flow velocity and the polydispersity is described by an exponential decay type function, more preferably defined as follows:

$$Đ = (0.08 \pm 0.01)e^{\frac{-v}{(147 \pm 28)}} + Đ_0$$

wherein Đ is defined as molar mass dispersity ($\overline{Mw}/\overline{Mn}$), and v as the linear flow velocity expressed in cm min$^{-1}$. $Đ_0$ is the minimum dispersity attainable for a particular polymer, and it is dependent on the properties, such as internal diameter, of the tubular flow reactor. Typically, larger diameters yield higher $Đ_0$ values.

In particular embodiments, the tubular flow reactor is operating in a laminar flow regime, wherein increasing the flow velocity is insufficient to produce a change to turbulent flow.

Finally, the cyclic imino ether polymers, particularly polyoxazolines obtainable by said process may find application in many fields. They may be used e.g. as additives or coatings, inks or adhesives, solvent and water-borne dispersants for pigments, hot melt adhesives, protective colloids for emulsion polymerization, encapsulants for pharmaceuticals, encapsulants for agricultural active ingredients, adjuvants for agricultural active ingredients, solubilizers for agricultural active ingredients primers, precursors for antifouling materials, compatibilizers for plastics, glass fiber sizing agents, cosmetics, water treatment agents or as lubricants. Furthermore, the living character of the polymerization of 2-oxazolines allows the synthesis of well-defined statistical and block copolymers by sequential monomer addition, and therefore the design of complex multifunctional architectures and the tuning of the (thermoresponsive) properties of the final polymer. Accordingly, the cyclic imino ether polymers, particularly polyoxazolines obtainable by the methods as envisaged herein may find application in complex smart materials. In addition, the cyclic imino ether polymers, particularly polyoxazolines obtainable by the methods as envisaged herein may find application as a biomaterial. In this context, the straightforward attachment of functional and reactive groups to both chain termini, such as by using suitable initiators, terminating agents and/or functionalizing agents, and to the polymer side groups, together with the biocompatibility of polyoxazolines, makes these polymers especially suited for the development of polymer therapeutics and biomaterials. Advantageously, well-defined polyoxazolines both in terms of functionalization and molar mass dispersity allow the effective application of polyoxazolines in biomedical applications including drug and gene delivery vehicles and depots, protein conjugates, or non-foaling coatings for medical devices and implants. Advantageously, the methods as envisaged herein potentially allow for the large scale production of such well-defined polyoxazolines via a continuous process, wherein, for instance, the production can be increased by coupling different tubular reactors as envisaged herein in parallel.

The present invention is further illustrated in the following non-limiting examples below.

EXAMPLES

Example 1. Reactor Set-Up

The reactor set-up included the following components:

Containers for the different reactants (monomer, solvent-initiator, terminator) and polymerized mixture, kept under inert atmosphere (Argon). The containers were Schott type bottles with GL14 screw neck and stoppers with multiple valves for connecting tubing (¼" 28G fittings);

Argon bottle and molecular sieves 13× column to dry the argon for keeping the containers under an inert atmosphere;

A dual piston HPLC pump (Azura P2.1S or P4.1S—Knauer (Germany)) for pumping the reactants through the flow reactor.

Pumps with pressure control and backflush valve are preferred to easily degas the tubing and monitor the reaction pressure. Pump heads can be selected for different flow rates, e.g. 10 mL or 50 mL maximum flow rates for the lab-scale Azura S series.

Dynamic mixing chamber V7119-1 from Knauer to mix reactants prior to entering the reactor;

shut-off valves to flush the pumps and 3-way valves to switch from different monomer/initiator stock solutions.

A coil of tubing, which constitutes the flow reactor. Tubing material was a polymer or metal, including stainless steel 316.

Tubing length was varied according to the desired reactor volume. Tubing diameter can also be varied to increase reactor volume.

Particularly, a tubing with outer diameter (OD) of 1/16" and ⅛" OD was used, with inner diameter (ID) ranging from 0.75 up to 2.4 mm.

This coil of tubing (flow reactor) is heated to the desired temperature, typically from 140° C. to 200° C. and preferably from 160° C. to 180° C. by immersion in an oil bath.

Alternatively, the tubing may be coiled around a metal heating block or placed in a thermostated oven. A jacketed thermostated tubing would also be suitable.

at the end of the tubing, outside of the heating medium, a back-pressure regulator (BPR) is placed to maintain a high pressure in the system and allow working at temperatures well beyond the boiling point of solvent and monomer. A BPR of 250 psi or 17 bar was used, but this can be easily varied by using different BPRs. Preferably, the pressure is at least 10 bar: a pressure of 7 bar was insufficient to prevent boiling of the solvent in the reactor (at the reaction temperature).

Polymer tubing was used to keep all reagents under argon and connect them to the pump and reactor, using suitable connectors, nuts and ferrules (which can be made of PEEK or stainless steel, depending on the tubing to be coupled to (polymer or metal)).

Example 2. Polymerization of 2-Ethyl-2-Oxazoline in Flow Reactors

Using the reactor setup of Example 1, several polymerization reactions were performed under varying reaction conditions (i.e. reaction volume, reaction time, reaction temperature). The monomer-initiator ratio was 60. The results are presented in Table 1.

TABLE 1 polymerization of 2-ethyl-2-oxazoline in a flow reactor

| Reactor | Temp. | time (min) | v (cm min⁻¹) | Conversion (%) | Mn | Đ |
|---|---|---|---|---|---|---|
| 1 mL | 140° C. | 10 | 22.6 | 99.4 | 10735 | 1.14 |
| | | 12.5 | 18.1 | 99.9 | 10872 | 1.14 |
| | 160° C. | 4 | 56.6 | 99.8 | 10749 | 1.15 |
| | | 5 | 45.3 | 100 | 10730 | 1.16 |
| 2 mL | 140° C. | 8 | 56.6 | 99.4 | 10938 | 1.13 |
| | | 9 | 50.3 | 99.7 | 11149 | 1.12 |
| | 160° C. | 3 | 150.9 | 99.3 | 11107 | 1.13 |
| | | 4 | 113.2 | 99.9 | 11917 | 1.16 |
| 5 mL | 140° C. | 8 | 141.5 | 99%+ | 10947 | 1.16 |
| | | 9 | 125.8 | 99%+ | 10955 | 1.11 |
| | 160° C. | 3 | 377.3 | 99%+ | 12358 | 1.11 |
| | | 4 | 282.9 | 99%+ | 12550 | 1.12 |
| 10 mL | 160° C. | 3 | 754.5 | 99%+ | 10959 | 1.10 |
| | | 4 | 565.9 | 99%+ | 11168 | 1.11 |
| 20 mL | 140° C. | 7.5 | 603.6 | 97.7% | 10350 | 1.11 |
| | | 8.5 | 532.6 | 99.2% | 10420 | 1.12 |
| | 160° C. | 3 | 1509.0 | 99.3% | 10400 | 1.10 |
| | | 4 | 1131.8 | 99.8% | 10400 | 1.11 |

Tubing ID=0.75 mm. % Conversion was calculated by Gas Chromatography (1, 2 and 20 mL) and by 1H NMR spectroscopy (5 and 10 mL). Typically, 100 microliter of the polymerization mixture was diluted into 800 microliter of chloroform and the sample was analyzed in a gas chromatograph equipped with a flame ionization detector (FID). The signals corresponding to the polymerization solvent (acetonitrile) and monomer (2-ethyl-2-oxazoline) were integrated and their ratio divided to that corresponding to a sample of polymerization mixture taken at t=0. This allowed to calculate the fraction of monomer consumed during the polymerization and thus the monomer conversion. Alternatively, a sample of the polymerization mixture was diluted in deuterated chloroform and analyzed by $^1$H-NMR spectroscopy. Monomer conversion was calculated from the ratio of the integral of the monomer peaks and the polymer backbone.

Under the test conditions, the optimal polymerization temperature was found to be 160° C. Surprisingly, polymer dispersity was observed to decrease with increasing reactor volume. In this setup, higher reaction volumes correspond to higher flow rates, as the reaction time and reactor tube inner diameter were not changed. It thus seems that higher flow rates lead to a more controlled polymerization. This is unexpected, as the polymer is subjected to higher shear forces in higher flow rates, theoretically leading to a more pronounced parabolic velocity profile which should negatively affect residence time distribution.

Example 3. Polymerization of 2-Ethyl-2-Oxazoline in Flow Reactors—Effect of Inner Diameter and Tubing Length A second series of polymerizations was performed to isolate the reactor tubing diameter from the effect observed in Example 2. To this end, 2-ethyl-2-oxazoline polymerizations were run in reactors with tubing of 5 different diameters and different lengths. Reaction temperature was 160° C. and reaction time was 3 or 4 min. The flow reactor comprised stainless steel tubings (1 mL reactor) or PTFE tubings. As seen in FIG. 2 (A+B), the data from five different tubing internal diameters are in agreement with the previous results obtained with the 0.75 mm ID tubing. It seems there is some variation in dispersity when the same linear velocity is applied in flow reactors with larger tubings, but the effect appears to be rather limited. Accordingly, it can be concluded that linear velocity can be used to control the molecular weight distribution of the final polymers, independent from the tubing diameter in its variation with flow velocity. The use of PTFE or stainless steel tubing did not seem to affect the polymerization.

The effect of varying the inner diameter of the reactor is also illustrated in Table 2.

TABLE 2

Different reactor diameters

| Reactor | Temp. | time (min) | v (cm min⁻¹) | Conversion (%) | Mn | Đ |
|---|---|---|---|---|---|---|
| 5 ml 0.75 mm ID | 140° C. | 8 | 141.5 | 99+$^a$ | 10950 | 1.16 |
| | | 9 | 125.8 | 99+$^a$ | 10950 | 1.11 |
| | 160° C. | 3 | 377.3 | 99+$^a$ | 12350 | 1.11 |
| | | 4 | 282.9 | 99+$^a$ | 12550 | 1.12 |
| 5 ml 1.5 mm ID | 140° C. | 8 | 35.4 | 99.1 | 10700 | 1.13 |
| | | 9 | 31.4 | 99.5 | 10800 | 1.15 |
| | 160° C. | 3 | 94.3 | 98.2 | 10600 | 1.16 |
| | | 4 | 70.7 | 99.6 | 10600 | 1.18 |
| 5 ml 2.0 mm ID | 140° C. | 8 | 19.9 | 99.5 | 10600 | 1.11 |
| | | 9 | 17.7 | 99.7 | 10800 | 1.15 |
| | 160° C. | 3 | 53.1 | 99.2 | 10200 | 1.15 |
| | | 4 | 39.8 | 99.7 | 10500 | 1.17 |
| 5 ml $^b$ 2.4 mm ID | 160° C. | 3 | 36.8 | 99.6 | 9500 | 1.20 |
| | | 4 | 27.6 | 99.8 | 9700 | 1.20 |

$^a$Measured by 1H-NMR. All other conversions determined by GC.
$^b$Independent feeding monomer and initiator/solvent stock solution.

Example 3. Other Variations in Reaction Conditions/Set-Up

Independent supply of monomer (M) and stock solution of initiator in acetonitrile (S/I) In this experimental setup, two pumps were used, both with pressure control. Also, a dynamic mixer was used. A stock solution of initiator (methyl tosylate) in acetonitrile was prepared, with a concentration of 0.112M, corresponding to a monomer to initiator ratio of 60 and a monomer concentration of 4 molar (4M). This solution was connected to a pump and then to the reactor via a dynamic mixer. Monomer (2-ethyl-2-oxazoline) was pumped analogously to the dynamic mixing chamber using a second pump. The flow rates of both monomer and stock solution of initiator were defined by the total flow rate—dictated by the reactor volume and the desired residence time—and the desired monomer concentration. In particular, for a 4 M monomer concentration, the ratio between the flow rate of initiator stock solution and monomer is equal to 1.476.

TABLE 3

Independent feeding of monomer and stock solution of initiator

| Reactor | Temp. | time (min) | v (cm · min⁻¹) | Conversion (%) | Mn | Đ |
|---|---|---|---|---|---|---|
| 18.5 mL 0.75 mm ID, M + S/I | 160° C. | 3 | 1395.9 | 99.2 | 9450 | 1.10 |
| | | 4 | 1046.8 | 99.9 | 8850 | 1.10 |
| 5 mL 0.75 mm ID, M + S/I | 160° C. | 3 | 377.3 | 99.4 | 7500 | 1.10 |
| | | 4 | 282.9 | 99.9 | 6800 | 1.10 |

The invention claimed is:

1. A method for the preparation of cyclic imino ether polymers in a tubular flow reactor, the method comprising:
feeding into the tubular flow reactor a reaction mixture comprising a cyclic imino ether monomer; and
allowing the formation of the cyclic imino ether polymers,
wherein the reaction mixture has a linear flow velocity of at least 120 cm/min in the tubular flow reactor, wherein the relation between the linear flow velocity and the polydispersity can be described by an exponential decay type function defined as follows:

$$D = (0.08 \pm 0.01) e^{(-v/(147 \pm 28))} + D_0$$

wherein D is defined as molar mass dispersity ($M_w/M_n$), v as the linear flow velocity expressed in cm min$^{-1}$ and $D_0$ is the minimum dispersity attainable for the cyclic amino ether polymer.

2. The method according to claim 1, wherein the linear flow velocity of the reaction mixture in the tubular flow reactor is at least 150 cm/min.

3. The method according to claim 1, wherein the tubular flow reactor operates in a laminar flow regime.

4. The method according to claim 1, wherein the cyclic imino ether polymer is a polyoxazoline polymer and the cyclic imino ether monomer is an oxazoline monomer.

5. The method according to claim 4, wherein the oxazoline monomer is a 2-oxazoline monomer according to formula (III)

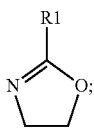

(III)

wherein R1 is H, CN, NO$_2$, alkyl, alkenyl, alkynyl, aryl, heteroaryl, or heterocyclyl.

6. The method according to, claim 1 wherein the cyclic imino ether polymer is a polyoxazine polymer and the cyclic imino ether monomer is an oxazine monomer.

7. The method according to claim 6, wherein the oxazine monomer is a 2-oxazine monomer according to formula (IV)

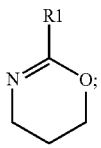

(IV)

wherein R1 is H, CN, NO$_2$, alkyl, alkenyl, alkynyl, aryl, heteroaryl, or heterocyclyl.

8. The method according to claim 1, wherein the cyclic imino ether polymer is a homopolymer or a copolymer.

9. The method according to claim 1, wherein the formation of the polymers is performed at a temperature ranging from 120° C. to 200° C.

10. The method according to claim 1, wherein the tubular flow reactor is heated by conductive heating.

11. The method according to claim 1, wherein the cyclic imino ether polymers have a polydispersity index of 1.40 or less.

12. The method according to claim 1, wherein the cyclic imino ether polymers have a degree of polymerization of at least 5.

13. The method according to claim 1, wherein the formation of the polymers is performed at a pressure of at least 5 bar.

14. The method according to claim 1, wherein the tubular flow reactor has a surface to volume ratio of at least 250 m$^2$/m$^3$.

15. The method according to claim 1, wherein the tubular flow reactor comprises a hollow conduit having an internal diameter ranging from 0.25 to 10 mm.

16. A method for controlling the polydispersity of cyclic imino ether polymers, the method comprising:
feeding a reaction mixture comprising a cyclic mine imino ether monomer to a tubular flow reactor; and
allowing polymerization of the cyclic imino ether monomers,
wherein increasing the linear flow velocity of the reaction mixture in the tubular flow reactor decreases the polydispersity of the cyclic imino ether polymers, wherein the relation between the linear flow velocity and the polydispersity can be described by an exponential decay type function defined as follows:

$$D = (0.08 \pm 0.01) e^{(-v/(147 \pm 28))} + D_0$$

wherein D is defined as molar mass dispersity (Mw/Wn), v as the linear flow velocity expressed in cm min$^{-1}$ and $D_0$ is the minimum dispersity attainable for the cyclic amino ether polymer.

17. The method according to claim 16, wherein the tubular flow reactor operates in the laminar flow regime.

18. The method according to claim 1, wherein the linear flow velocity of the reaction mixture in the tubular flow reactor is at least 200 cm/min.

19. The method according to claim 1, wherein the formation of the polymers is performed at a temperature ranging from from 140° C. to 180° C.

* * * * *